2 Sheets—Sheet 1.

D. ARMSTRONG.

Machine for Making Wrought Iron Nails.

No. 3,969. Reissued May 17, 1870.

Witnesses:
E. E. Gifson
G. L. Chapin.

Inventor:
Daniel Armstrong

N. PETERS, Photo-Lithographer, Washington, D. C.

2 Sheets—Sheet 2.

D. ARMSTRONG.

Machine for Making Wrought Iron Nails.

No. 3,969.

Reissued May 17, 1870.

Witnesses
G. L. Chapin,
E. E. Gibson

Inventor:
Daniel Armstrong

N. PETERS, Photo-Lithographer, Washington, D. C.

United States Patent Office.

DANIEL ARMSTRONG, OF CHICAGO, ILLINOIS.

*Letters Patent No.* 98,008, *dated December* 21, 1869; *reissue No.* 3,969, *dated May* 17, 1870.

IMPROVEMENT IN MACHINES FOR MAKING WROUGHT NAILS.

The Schedule referred to in these Letters Patent and making part of the same

*To all whom it may concern:*

Be it known that I, DANIEL ARMSTRONG, of Chicago, in the county of Cook and State of Illinois, have invented a new and useful Improvement in Machines for making Wrought-Nails; and I do hereby declare the following to be a full, clear, and exact description thereof, which will enable others skilled in the art to which my invention appertains to make and use the same, reference being had to the accompanying drawings forming part of this specification.

Figures 1, 2:
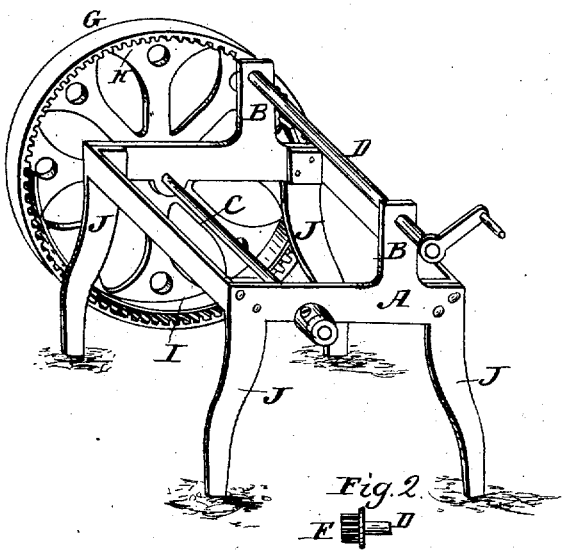
Figure 3:
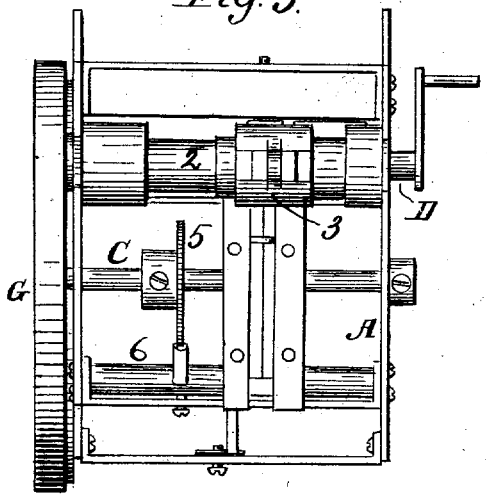
Figure 4:
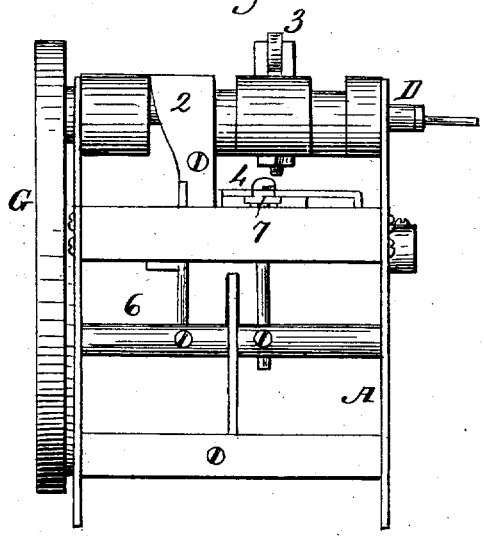

Figure 1, Sheet I, is a perspective view of a portion of a nail-machine, showing my improvements;

Figure 2, Sheet I, is a detached view of the driving-pinion attached to the main shaft;

Figure 3, Sheet II, is a plan view of a nail-machine containing my improvements; and Figure 4, Sheet II, is a front elevation of the same.

Similar letters of reference indicate corresponding parts in the several figures of the drawings.

My invention relates to that class of machines designed for manufacturing wrought nails, but more especially horse-shoe nails, and has for its object to improve the construction of the machine described in Letters Patent of the United States granted to Daniel Dodge, August 23, 1859, numbered 25,183.

In his machine the main driving shaft carries a roller, which forms the upper die for drawing out the metal. A cam-shaft is also employed for operating a reciprocating carrier, by which the nail-rod is fed to the dies and anvil.

Motion is communicated to the cam-shaft from the driving-shaft by the following arrangement of gearing:

Upon one end of the driving-shaft is mounted a pinion, which meshes into a spur-gear wheel mounted upon a secondary shaft interposed between the driving and shaft.

The secondary shaft is also provided with a pinion, which meshes into a spur-gear wheel mounted upon the cam-shaft.

By this arrangement there are four cog-wheels and three shafts employed to operate the devices for feeding the metal to the dies.

When a train of gearing including three or more wheels is employed, there is necessarily much loss of motion by the back-lashing of the cogs, and, as these machines run at a high rate of speed, the least back-lash is productive of much injury by the constant breakage of cogs.

To overcome the back-lash as much as possible, and to bring the various parts of the machine within the proper compass, the gears and pinions should be as few as possible in number, of comparatively small size, and fitted snugly together.

While this does not effectually avoid the back-lash, it at least diminishes the liability to such action.

To overcome these difficulties my invention consists in operating the cam-shaft from the driving-shaft direct, by means of a pinion upon the latter, meshing into a large gear-wheel upon the former, without changing the relative position of these two shafts.

To effect this change in the Dodge machine, it is only necessary to remove the intermediate or secondary shaft and its cog-wheels, and to extend the cam-shaft as far outside of the frame as the secondary shaft now extends, and to substitute a large gear-wheel for that which is upon the cam-shaft.

By the use of the large gear-wheel the motion of the cam-shaft would be rendered more uniform, and the back-lash of the cogs diminished.

In the accompanying drawings—

A is a substantial frame-work, supported upon legs J, in the usual manner, and is so formed as to carry the working parts of the Dodge machine hereinbefore referred to.

D is the main driving-shaft of the machine, hung in bearings B at the front of the frame, and from which motion is derived to operate the eccentric 2 and dies 3, 4, for forming nails.

In order to diminish back-lashing of the gearing and its attendant evils, as previously described, the cam-shaft C is driven direct from the shaft D by means of a large internal-gear wheel G mounted upon the cam-shaft, and put in motion by a pinion, F, affixed to the end of the shaft D.

The gear-wheel G is formed with cogs upon its inner circumference, so that the flange of the wheel shall shut over the pinion F to protect the latter from chips and metal scales. If preferred, a spur-wheel may be used instead of the internally-geared wheel.

E is the clamp by which the nail-rod is held in the proper position for forging nails.

This clamp is operated by the rock-shaft F, to which motion is communicated by means of a cam, H, mounted upon the shaft C.

The lever or bar I, upon the rock-shaft, is held in contact with the face of the cam by means of a spring J′, bearing against the rock-shaft.

In the operation of these devices back-lash of the gearing is principally felt.

The nail-rod, as it is fed into the machine, must enter the dies the instant the latter open sufficiently wide to admit it, and before they are opened to their fullest capacity. If it is not fed forward at this instant the dies will close before sufficient metal has entered them to form a nail; and, if fed forward before the dies are opened, the end of the nail-rod comes in contact with said dies with such force as to bend the rod out of shape and prevent the formation of a nail.

In order, therefore, to form a nail properly, these parts must operate with the utmost exactitude.

As the back-lash of the gearing affects the cam E and varies its movement, and as the feed of the nail-rod is governed entirely by the motion of the cam, it consequently follows that the back-lash affects the proper feed of the nail-rod to form a nail.

K is a housing secured rigidly to the frame A, and extending within the gear-wheel G, to cover the cogs upon its lower portion.

This housing collects the clippings of nails and scales of iron which fall from the machine, and prevents their entering between the cogs of the gear-wheel to interfere with the successful operation of the machinery.

Having thus described my invention as an improvement of the machine described in the patent to Daniel Dodge, dated August, 23, 1859,

I claim—

1. The arrangement of the pinion on the driving-shaft and the cogged wheel on the cam-shaft in direct contact with one another, for the purpose specified.

2. The combination with the driving-pinion of the internally-cogged wheel on the cam-shaft, and the housing K, substantially as and for the purpose set forth.

DANIEL ARMSTRONG.

Witnesses:
G. H. FROST,
D. I. POWERS.